United States Patent
Hsu et al.

(10) Patent No.: US 11,958,929 B2
(45) Date of Patent: Apr. 16, 2024

(54) ORGANOMETALLIC COMPLEX, CATALYST COMPOSITION EMPLOYING THE SAME, AND METHOD FOR PREPARING POLYOLEFIN

(71) Applicant: INDUSTRIAL TECHNOLOGY RESEARCH INSTITUTE, Hsinchu (TW)

(72) Inventors: Chien-Wei Hsu, Houlong Township (TW); Jyun-Wei Hong, Fangyuan Township (TW); Pao Tsern Lin, Zhubei (TW); Shu-Hua Chan, Taichung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 17/849,408

(22) Filed: Jun. 24, 2022

(65) Prior Publication Data

US 2023/0203211 A1 Jun. 29, 2023

(30) Foreign Application Priority Data

Dec. 27, 2021 (TW) ................................ 110148857

(51) Int. Cl.
| | | |
|---|---|---|
| C07F 7/28 | (2006.01) | |
| C08F 4/02 | (2006.01) | |
| C08F 4/64 | (2006.01) | |
| C08F 4/642 | (2006.01) | |
| C08F 4/76 | (2006.01) | |
| C08F 10/02 | (2006.01) | |

(52) U.S. Cl.
CPC ............... *C08F 4/76* (2013.01); *C07F 7/28* (2013.01); *C08F 4/025* (2013.01); *C08F 10/02* (2013.01)

(58) Field of Classification Search
CPC .............................. C08F 4/64055; C07F 7/28
See application file for complete search history.

(56) References Cited

U.S. PATENT DOCUMENTS

| | | | |
|---|---|---|---|
| 6,635,728 B2 | 10/2003 | Liu | |
| 7,300,903 B2 | 11/2007 | Fujita et al. | |
| 8,034,886 B2 | 10/2011 | Dickner et al. | |
| 8,324,126 B2 | 12/2012 | Miranda et al. | |
| 8,637,618 B2 | 1/2014 | Diamond et al. | |
| 9,045,440 B2 | 6/2015 | Malecha | |
| 9,175,108 B2 | 11/2015 | Sarma et al. | |
| 9,260,538 B2 | 2/2016 | Sarma et al. | |
| 9,422,382 B2 | 8/2016 | Alliger et al. | |
| 9,617,362 B2 | 4/2017 | Wassenaar | |
| 9,771,440 B2 | 9/2017 | Severn et al. | |
| 10,465,019 B2 | 11/2019 | Chikkali et al. | |
| 10,711,105 B2 | 7/2020 | Miyamoto et al. | |
| 2016/0002269 A1 | 1/2016 | Shanzer et al. | |
| 2017/0226242 A1 | 8/2017 | Smeets et al. | |
| 2020/0407387 A1 | 12/2020 | Bagui et al. | |

FOREIGN PATENT DOCUMENTS

| | | |
|---|---|---|
| CN | 102250285 A | 11/2011 |
| CN | 103842394 A | 6/2014 |

OTHER PUBLICATIONS

Taiwanese Office Action and Search Report for Taiwanese Application No. 110148857, dated Aug. 3, 2022.

*Primary Examiner* — Caixia Lu
(74) *Attorney, Agent, or Firm* — Birch, Stewart, Kolasch & Birch, LLP

(57) ABSTRACT

An organometallic complex, a catalyst composition employing the same, and a method for preparing polyolefin are provided. The organometallic compound has a structure represented by Formula (I)

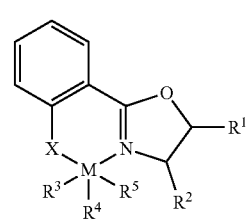

Formula (I)

wherein M is Ti, Zr, or Hf; X is —O—, or —NR$^6$—; R$^1$ and R$^2$ are independently hydrogen, $C_{1-6}$ alkyl group, $C_{6-12}$ aryl group, or R$^1$ and R$^2$ are combined with the carbon atoms, to which they are attached, to form an $C_{6-12}$ aryl moiety; R$^3$, R$^4$ and R$^5$ are independently fluoride, chloride, bromide, $C_{1-6}$ alkyl group, $C_{6-12}$ aryl group, $C_{3-6}$ hetero aryl group, $C_{7-13}$ aryl alkyl group or $C_{7-12}$ alkyl aryl group; and R$^6$ is hydrogen, $C_{6-12}$ aryl group or $C_{7-12}$ alkyl aryl group.

21 Claims, No Drawings

ORGANOMETALLIC COMPLEX, CATALYST COMPOSITION EMPLOYING THE SAME, AND METHOD FOR PREPARING POLYOLEFIN

CROSS REFERENCE TO RELATED APPLICATIONS

This Application is based on, and claims priority from Taiwan Patent Application No. 110148857, filed on Dec. 27, 2021, the disclosure of which is hereby incorporated by reference herein in its entirety.

TECHNICAL FIELD

The disclosure relates to an organometallic complex, a catalyst composition employing the organometallic complex, and a method for preparing polyolefin.

BACKGROUND

In the polymer industry, polyolefin materials occupy more than half of the plastic demand in the world, and the demand for polyolefin is increasing year by year. Among of polyolefins, polyethylene (PE) is getting noticed and more widely used.

Polyethylene (PE) (such as low density polyethylene (LDPE)) is generally synthesized by radical polymerization under high temperature and high pressure. With the development of metal complex catalysts, the reaction can be carried out under mild conditions, and the degree of polymerization (DP) can be improved to produce high-density polyethylene (HDPE). In recent years, through the design of catalyst, the degree of polymerization can break through to a new level. Therefore, an ultra-high molecular weight polyethylene (UHMWPE) has been developed which further expands the applications for polyethylene (PE) in the industry.

Ultra-high-molecular-weight polyethylene (UHMWPE) is a polyethylene which has a molecular weight of more than one million. Ultra-high-molecular-weight polyethylene (UHMWPE) is colorless, odorless, and non-toxic. Furthermore, due to higher wear resistance, corrosion resistance, lubrication and lower hygroscopicity, ultra-high-molecular-weight polyethylene (UHMWPE) is widely used in military applications, medical equipment, and the automobile industry.

Higher molecular weight polyethylene can be polymerized through a Ziegler-Natta catalyst system, however, the obtained polyethylene (PE) exhibits broad molecular weight distribution with higher polydispersity index (PDI). In comparison with conventional Ziegler-Natta catalyst systems, the homogeneous metallocene catalyst systems not only show high catalytic activity, but also have the capacity to control the polydispersity index (PDI) of polyolefin. In general, the conventional homogeneous metallocene catalyst system needs to be activated with a large number of methylaluminoxane (MAO) serving as a co-catalyst (the dosage of MAO is about 650-1000 times of the metal catalyst). Due to the high cost of methylaluminoxane (MAO), the process for preparing polyethylene should be optimized such as decreasing the amount of MAO dosage or other co-catalyst substitution in order to reduce the cost. In addition, methylaluminoxane (MAO) may easily deteriorate (i.e. forming a colloid gel), and needs to deposit in cold conditions (in general, it can only be stored for 7 days at room temperature), it is therefore inconvenient for use in practical applications.

Therefore, a novel catalyst to solve the aforementioned problem is called for.

SUMMARY

According to embodiments of the disclosure, the disclosure provides an organometallic complex. The organometallic complex of the disclosure has a structure represented by Formula (I)

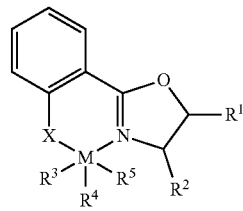

Formula (I)

wherein M is Ti, Zr, or Hf; X is —O—, or —NR$^6$—; R$^1$ and R$^2$ are independently hydrogen, C$_{1-6}$ alkyl group, C$_{6-12}$ aryl group, or R$^1$ and R$^2$ are combined with the carbon atoms, to which they are attached, to form an C$_{6-12}$ aryl moiety; R$^3$, R$^4$ and R$^5$ are independently fluorine, chlorine, bromine, C$_{1-6}$ alkyl group, C$_{6-12}$ aryl group, C$_{3-6}$ heteroaryl, C$_{7-13}$ arylalkyl group, or C$_{7-12}$ alkylaryl group; and R$^6$ is hydrogen, C$_{6-12}$ aryl group, or C$_{7-12}$ alkylaryl group.

According to some embodiments of the disclosure, the disclosure provides a catalyst composition. The catalyst composition includes the aforementioned organometallic complex and a co-catalyst, wherein the molar ratio of the co-catalyst to the organometallic complex is 2000:1 to 10:1. According to embodiments of the disclosure, the catalyst composition can further include a carrier.

According to some embodiments of the disclosure, the disclosure provides a method for preparing a polyolefin. The polyolefin can be synthesized through one or more olefin monomer (such as alpha-olefin monomer), wherein the olefin monomer can be ethylene, propylene, isobutylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, isoprene, or 1-decene. The method for preparing the polyolefin includes subjecting an olefin monomer in the presence of the catalyst composition of the disclosure to a polymerization (or copolymerization), obtaining the required polyolefin.

A detailed description is given in the following embodiments.

DETAILED DESCRIPTION

The organometallic complex, catalyst composition, and method for preparing polyolefin of the disclosure are described in detail in the following description. In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments. As used herein, the term "about" in quantitative terms refers to plus or minus an amount that is general and reasonable to persons skilled in the art.

The embodiments of the disclosure provide an organometallic complex, a catalyst composition employing the organometallic complex, and a method for preparing a polyolefin (such as high molecular weight polyethylene (HMWPE) or ultra-high-molecular-weight polyethylene (UHMWPE)). According to embodiments of the disclosure, the organometallic complex of the disclosure has a core of Group IVB transition metal coordinated with one oxazoline bidentate ligand and three monodentate ligands. In the preparation of polyolefin employing the organometallic complex serving as catalyst, the preparation can be performed in the absence of the expensive and unstable methylaluminoxane (MAO) compound (serving as co-catalyst) and the amount of co-catalyst can be reduced.

As a result, the manufacturing cost of polyolefin and the amount of residual co-catalyst can be reduced, thereby preventing the properties of the polyolefin from deterioration caused by the residual co-catalyst. In addition, the catalyst composition of the disclosure maintains catalytic activity under long-term polymerization conditions and does not cause reactor fouling problems after reaction. Furthermore, when employing the catalyst composition of the disclosure for the preparation of polyolefin, the process conditions (such as reaction time, temperature, pressure) can be adjusted to obtain polyolefin with various molecular weight (such as polyolefin with a viscosity-average molecular weight of 500,000 to 6,000,000 g/mol).

According to embodiments of the disclosure, the organometallic complex can have a structure represented by Formula (I)

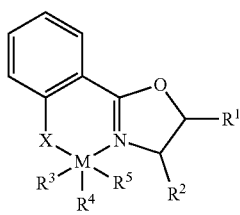

Formula (I)

wherein M is Ti, Zr, or Hf; X is —O—, or —NR$^6$—; R and R$^2$ are independently hydrogen, $C_{1-6}$ alkyl group, $C_{6-12}$ aryl group, or R$^1$ and R$^2$ are combined with the carbon atoms, to which they are attached, to form an $C_{6-12}$ aryl moiety; R$^3$, R$^4$ and R$^5$ are independently fluorine, chlorine, bromine, $C_{1-6}$ alkyl group, $C_{6-12}$ aryl group, $C_{3-6}$ heteroaryl, $C_{7-13}$ arylalkyl group, or $C_{7-12}$ alkylaryl group; and R$^6$ is hydrogen, $C_{6-12}$ aryl group, or $C_{7-12}$ alkylaryl group.

According to embodiments of the disclosure, $C_{1-6}$ alkyl group of the disclosure can be linear or branched alkyl group. For example, $C_{1-6}$ alkyl group can be methyl group, ethyl group, propyl group, butyl group, pentyl group, hexyl group, or an isomer thereof. According to embodiments of the disclosure, the $C_{6-12}$ aryl group of the disclosure can be a phenyl group, biphenyl group, or naphthyl group. According to embodiments of the disclosure, $C_{3-6}$ heteroaryl can be furyl group, imidazolyl group, pyridyl group, thiazolyl group, thienyl group, or triazolyl group. According to embodiments of the disclosure, $C_{7-13}$ arylalkyl group of the disclosure means an alkyl group which at least one hydrogen atom thereof is replaced with phenyl group. The $C_{7-13}$ arylalkyl group of the disclosure can be a benzyl group, methylbenzyl group, phenylethyl group, phenylpropyl group, phenylbutyl group, or diphenyl methyl group. According to embodiments of the disclosure, the $C_{7-12}$ alkylaryl group of the disclosure means a phenyl group which at least one hydrogen atom thereof is replaced with alkyl group. The $C_{7-12}$ alkylaryl group of the disclosure can be a methylphenyl group, dimethylphenyl group, trimethylphenyl group, ethylphenyl group, propylphenyl group, or butylphenyl group.

According to embodiments of the disclosure, R$^1$ and R$^2$ can be independently hydrogen, methyl group, ethyl group, propyl group, butyl group, pentyl group, hexyl group, phenyl group, biphenyl group, or naphthyl group. In addition, according to embodiments of the disclosure, R$^1$ and R$^2$ are linked together with the carbon atoms to which R$^1$ and R$^2$ are attached to form a benzene or naphthalene.

According to embodiments of the disclosure, R$^3$, R$^4$ and R$^5$ can be independently fluorine, chlorine, bromine, methyl group, ethyl group, propyl group, butyl group, pentyl group, hexyl group, phenyl group, biphenyl group, naphthyl group, furyl group, imidazolyl group, pyridyl group, thiazolyl group, thienyl group, triazolyl group, benzyl group, methylbenzyl group, phenylethyl group, phenylpropyl group, phenylbutyl group, diphenyl methyl group, methylphenyl group, dimethylphenyl group, dimethylphenyl group, ethylphenyl group, propylphenyl group, or butylphenyl group.

According to embodiments of the disclosure, R$^6$ can be hydrogen, phenyl group, biphenyl group, naphthyl group, methylphenyl group, dimethylphenyl group, dimethylphenyl group, ethylphenyl group, propylphenyl group, or butylphenyl group.

According to embodiments of the disclosure, the organometallic complex can be

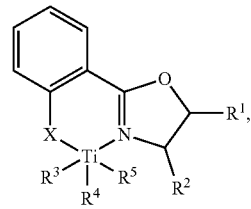

wherein X can be —O—, or —NR$^6$—; R$^1$ and R$^2$ can be independently hydrogen, $C_{1-6}$ alkyl group, $C_{6-12}$ aryl group, or R$^1$ and R$^2$ are combined with the carbon atoms, to which they are attached, to form an $C_{6-12}$ aryl moiety; R$^3$, R$^4$ and R$^5$ can be independently fluorine, chlorine, bromine, $C_{1-6}$ alkyl group, $C_{6-12}$ aryl group, $C_{3-6}$ heteroaryl, $C_{7-13}$ arylalkyl group, or $C_{7-12}$ alkylaryl group; and R$^6$ can be hydrogen, $C_{6-12}$ aryl group, or $C_{7-12}$ alkylaryl group.

According to embodiments of the disclosure, the organometallic complex can be

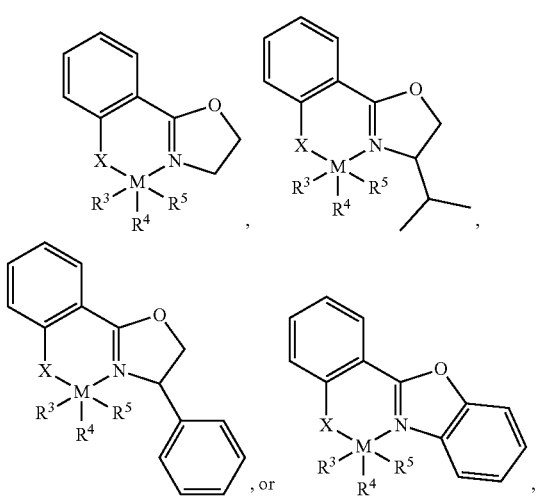

wherein M can be Ti, Zr, or Hf; X is —O—, or —NR$^6$—; R$^3$, R$^4$ and R$^5$ can be independently fluorine, chlorine, bromine, C$_{1-6}$ alkyl group, C$_{6-12}$ aryl group, C$_{3-6}$ heteroaryl, C$_{7-13}$ arylalkyl group, or C$_{7-12}$ alkylaryl group; and R$^6$ can be hydrogen, C$_{6-12}$ aryl group, or C$_{7-12}$ alkylaryl group.

According to embodiments of the disclosure, the organometallic complex can be

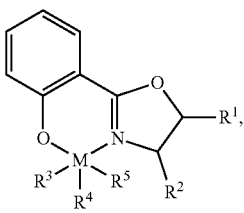

or

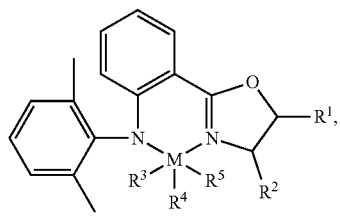

wherein M can be Ti, Zr, or Hf; R$^1$ and R$^2$ can be independently hydrogen, C$_{1-6}$ alkyl group, C$_{6-12}$ aryl group, or R$^1$ and R$^2$ are combined with the carbon atoms, to which they are attached, to form an C$_{6-12}$ aryl moiety; and R$^3$, R$^4$ and R$^5$ can be independently fluorine, chlorine, bromine, C$_{1-6}$ alkyl group, C$_{6-12}$ aryl group, C$_{3-6}$ heteroaryl, C$_{7-13}$ arylalkyl group, or C$_{7-12}$ alkylaryl group.

According to embodiments of the disclosure, the organometallic complex can be

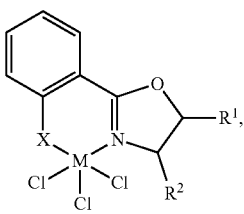

or

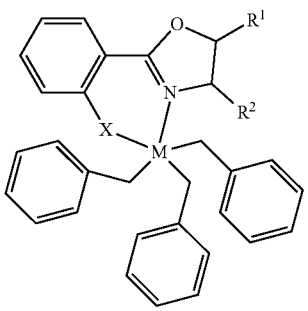

wherein M can be Ti, Zr, or Hf; X can be —O—, or —NR$^6$—; R and R$^2$ can be independently hydrogen, C$_{1-6}$ alkyl group, C$_{6-12}$ aryl group, or R$^1$ and R$^2$ are combined with the carbon atoms, to which they are attached, to form an C$_{6-12}$ aryl moiety; and R$^6$ can be hydrogen, C$_{6-12}$ aryl group, or C$_{7-12}$ alkylaryl group.

According to embodiments of the disclosure, the disclosure provides a catalyst composition. The catalyst composition can include the organometallic complex of the disclosure, and a co-catalyst, wherein the molar ratio of the co-catalyst to the organometallic complex can be 2000:1 to 10:1, such as 1000:1 to 10:1, 1000:1 to 50:1, 500:1 to 10:1, 500:1 to 50:1, 200:1 to 10:1, or 200:1 to 50:1. According to embodiments of the disclosure, since the catalyst composition of the disclosure includes the organometallic complex having a structure represented by Formula (I), the molar ratio of the co-catalyst to the organometallic complex can be 200:1 to 10:1 in the catalyst composition of the disclosure.

According to embodiments of the disclosure, the catalytic promoter can be trimethylaluminum, triethylaluminum, triisopropylaluminum, triisobutylaluminum, methylaluminum dichloride, dimethylaluminum chloride, ethylaluminumsesquichloride, diethylaluminum chloride, ethylaluminumdichloride, methylaluminoxane (MAO), or a combination thereof.

According to embodiments of the disclosure, when the catalyst composition employs the organometallic complex as the catalyst, a co-catalyst, which is not methylaluminoxane (MAO) compound (such as trimethylaluminum, triethylaluminum, triisopropylaluminum, triisobutylaluminum, ethylaluminumsesquichloride, diethylaluminum chloride, or ethylaluminumdichloride) can be used as the co-catalyst due to the specific structure of the organometallic complex.

According to embodiments of the disclosure, the catalyst composition of the disclosure can consist of the organometallic complex of the disclosure and co-catalyst. In addition, according to some embodiments of the disclosure, the catalyst composition of the disclosure can include the organometallic complex, the co-catalyst, and a carrier. Furthermore, according to other embodiments of the disclosure, the catalyst composition of the disclosure can consist of the organometallic complex, the co-catalyst, and the carrier. According to embodiments of the disclosure, the carrier can be aluminum oxide, silicon oxide, clay, zeolite, titanium oxide, zirconium oxide, magnesium oxide, or magnesium chloride. In addition, according to embodiments of the disclosure, the weight ratio of the carrier to the organometallic complex can be about 200:1 to 1:1, such as 180:1, 150:1, 120:1, 100:1, 80:1, 50:1, 30:1, 20:1, 10:1, 5:1, 3:1, or 2:1.

According to embodiments of the disclosure, the disclosure provides a method for preparing the polyolefin. The method for preparing the polyolefin includes subjecting the olefin monomer to a polymerization in the presence of the catalyst composition of the disclosure to obtain a polyolefin. According to embodiments of the disclosure, the olefin monomer can be ethylene, propylene, isobutylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, isoprene, or 1-decene. According to embodiments of the disclosure, the polymerization of the olefin monomer can be performed in the presence of hydrogen gas. According to embodiments of the disclosure, a volume ratio of the olefin monomer to the hydrogen gas is 100:1 to 10:1. According to embodiments of the disclosure, in the method for preparing the polyolefin, an input pressure of the olefin monomer can be about 50 psi to 1000 psi, such as 50 psi to 800 psi, 50 psi to 600 psi, 50 psi to 500 psi, 75 psi to 1000 psi, 100 psi to 1000 psi, 150 psi to 1000 psi, 150 psi to 800 psi, 150 psi to 700 psi, 150 psi to 600 psi, or 150 psi to 500 psi. According to embodiments of the disclosure, when the input pressure of the olefin monomer is between about 150 psi to 500 psi, the catalyst composition exhibits superior catalytic activity in the preparation of polyolefin.

According to embodiments of the disclosure, in the method for preparing the polyolefin, a process time of the polymerization can be about 10 minutes to 300 minutes, such as 10 minutes to 300 minutes, 20 minutes to 300 minutes, 20 minutes to 240 minutes, 30 minutes to 240 minutes, 60 minutes to 240 minutes, or 60 minutes to 180 minutes. According to embodiments of the disclosure, in the method for preparing the polyolefin, a process temperature of the polymerization can be about 50° C. to 100° C., such as 60° C. to 90° C. When the process temperature of the polymerization is too high or too low, the catalyst composition exhibits inferior catalytic activity in the preparation of polyolefin.

According to embodiments of the disclosure, the method for preparing the polyolefin of the disclosure can be used to prepare the polyolefin with a viscosity-average molecular weight of about 500,000 g/mol to 6,000,000 g/mol (such as 700,000 g/mol to 5,500,000 g/mol). According to embodiments of the disclosure, the viscosity-average molecular weight of the disclosure can be measured according to ASTM D-4020 with Margolies equation. According to embodiments of the disclosure, the method for preparing the polyolefin of the disclosure can be used to prepare high molecular weight polyethylene (HMWPE), or ultra-high-molecular-weight polyethylene (UHMWPE).

Below, exemplary embodiments will be described in detail so as to be easily realized by a person having ordinary knowledge in the art. The inventive concept may be embodied in various forms without being limited to the exemplary embodiments set forth herein.

EXAMPLES

Preparation of Organometallic Compound

Example 1

2-hydroxybenzonitrile (4 g), S-valinol (4.49 mL), zinc chloride (ZnCl$_2$) (0.229 g) were added into a reaction bottle, and then toluene (34 mL) (serving as solvent) was added into the reaction bottle. After stirring at 110° C. for 12 hours, the solvent was removed and the crude product was purified by column chromatography (with hexane and ethyl acetate (EA) as the eluent, wherein hexane:EA=98:2), obtaining Compound (1). The synthesis pathway of the above reaction was as follows:

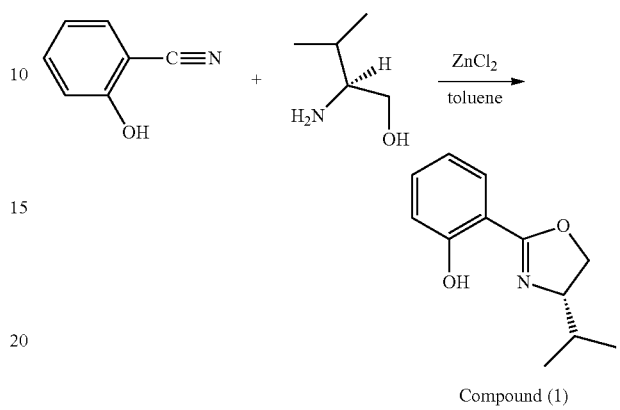

Compound (1)

Next, the measurement results of nuclear magnetic resonance spectrometry of Compound (1) are shown below: $^1$H NMR (400 MHz, CDCl$_3$) 12.34 (s, 1H), 7.61 (d, 1H), 7.34 (t, 1H), 6.98 (d, 1H), 6.84 (t, 1H), 4.44-4.38 (m, 1H), 4.15-4.08 (m, 2H), 1.00 (d, 3H), 0.93 (d, 3H).

Next, Compound (1) (1.54 g) was added into a reaction bottle, and then heptane (70 mL) was added into the reaction bottle to dissolve Compound (1). Next, titanium tetrachloride (TiCl$_4$) (1.79 g) was added into the reaction bottle. After stirring at room temperature for 24 hours, a formation of tangerine solid was observed. After filtration, the obtained filter cake was dried, obtaining Organometallic complex (I) with a yield of 99%. The synthesis pathway of the above reaction was as follows:

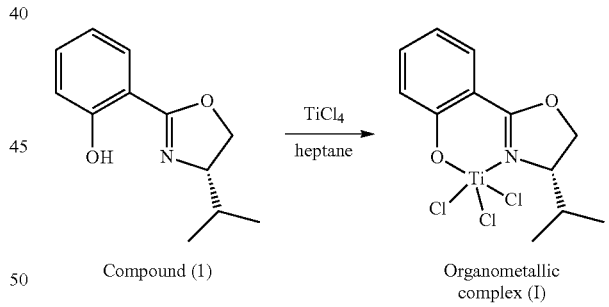

Compound (1)                    Organometallic complex (I)

Next, the measurement results of nuclear magnetic resonance spectrometry of Organometallic complex (I) are shown below: $^1$H NMR (400 MHz, d$_8$-THF) 7.90 (d, 1H), 7.54 (t, 1H), 7.03 (t, 1H), 6.57 (d, 1H), 5.13 (t, 1H), 4.62 (d, 2H), 0.77 (s, 3H), 0.69 (s, 3H).

Example 2

Organometallic complex (I) (1.5 g) were added into a reaction bottle. Next, tetrahydrofuran (THF) (80 mL) was added into the reaction bottle to dissolve Organometallic complex (I). Next, benzyl magnesium chloride solution (15.8 mL, with a concentration of 1M (dissolved in ethyl ether)) was added into the reaction bottle. After stirring at room temperature for 12 hours, a formation of purple solid was observed. The solvent was removed under vacuum, obtaining a catalyst composite of Organometallic complex (II) and MgCl$_2$, with a yield of 99%. The synthesis pathway of the above reaction was as follows:

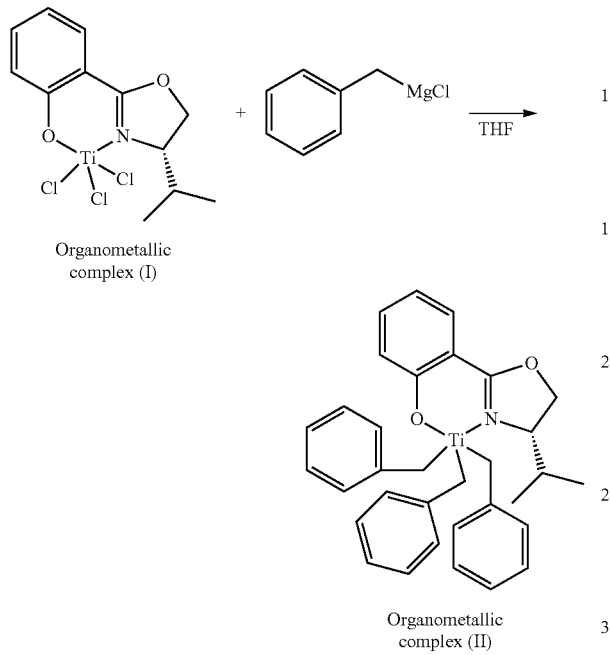

Organometallic complex (I)

Organometallic complex (II)

Next, the measurement results of nuclear magnetic resonance spectrometry of Organometallic complex (II) are shown below: $^1$H NMR (400 MHz, C$_6$D$_6$) 7.88 (d, 1H), 7.16-6.98 (m, 16H), 6.69 (t, 1H), 6.63 (d, 1H), 3.84-3.51 (m, 3H), 2.73 (s, 3H), 0.76 (s, 3H), 0.59 (s, 3H).

Example 3

2-hydroxybenzonitrile (2 g), ethanolamine (ethanolamine, 1.22 ml), zinc chloride (ZnCl$_2$) (0.114 g) were added into a reaction bottle, and then toluene (17 mL) (serving as solvent) was added into the reaction bottle. After stirring at 110° C. for 12 hours, the solvent was removed and the crude product was purified by column chromatography (with hexane and ethyl acetate (EA) as the eluent, wherein hexane:EA=98:2), obtaining Compound (2). The synthesis pathway of the above reaction was as follows:

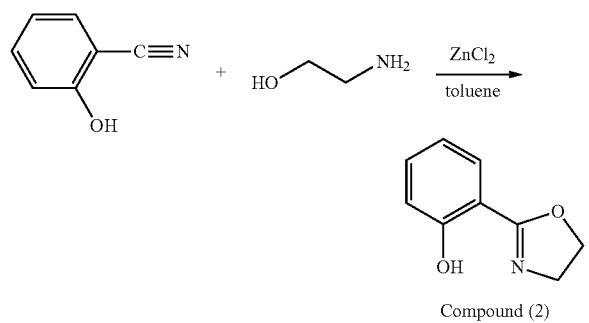

Compound (2)

Next, the measurement results of nuclear magnetic resonance spectrometry of Compound (2) are shown below: $^1$H NMR (400 MHz, CDCl$_3$) 12.13 (s, 1H), 7.63 (d, 1H), 7.34 (t, 1H), 6.98 (d, 1H), 6.84 (t, 1H), 4.41 (t, 2H), 4.08 (t, 2H).

Next, Compound (2) (1.54 g) was added into a reaction bottle, and then heptane (70 mL) was added into the reaction bottle to dissolve Compound (2). Next, titanium tetrachloride (TiCl$_4$) (1.79 g) was added into the reaction bottle. After stirring at room temperature for 24 hours, a formation of tangerine solid was observed. After filtration, the solid was collected. Next, the solid was added into a reaction bottle. Next, tetrahydrofuran (THF) (80 mL) was added into the reaction bottle to dissolve the solid. Next, benzyl magnesium chloride solution (15.8 mL, with a concentration of 1M (dissolved in ethyl ether)) was added into the reaction bottle. After stirring at room temperature for 12 hours, a formation of purple solid was observed. The solvent was removed under vacuum, obtaining a catalyst composite of Organometallic complex (III) and MgCl$_2$, with a yield of 99%. The synthesis pathway of the above reaction was as follows:

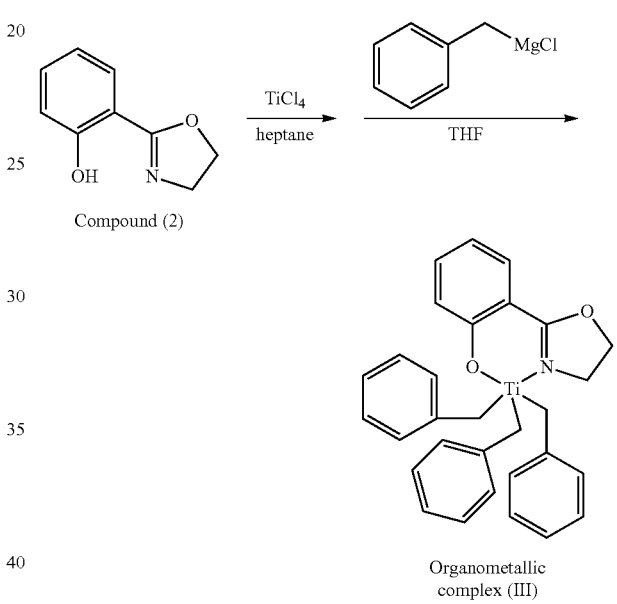

Compound (2)

Organometallic complex (III)

Next, the measurement results of nuclear magnetic resonance spectrometry of Organometallic complex (III) are shown below: $^1$H NMR (400 MHz, C6D6) 7.35 (d, 1H), 7.25-7.05 (m, 16H), 6.83 (t, 1H), 6.70 (d, 1H), 3.90-3.50 (m, 4H).

Example 4

2-hydroxybenzonitrile (2 g), R-2-phenylglycinol (2.76 g), and zinc chloride (ZnCl$_2$) (0.114 g) were added into a reaction bottle, and then toluene (17 mL) (serving as solvent) was added into the reaction bottle. After stirring at 110° C. for 12 hours, the solvent was removed and the crude product was purified by column chromatography (with hexane and ethyl acetate (EA) as the eluent, wherein hexane:EA=98:2), obtaining Compound (3). The synthesis pathway of the above reaction was as follows:

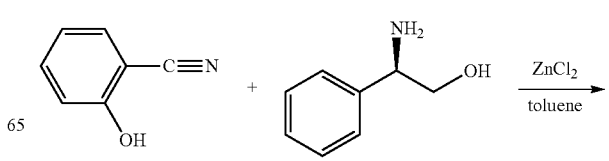

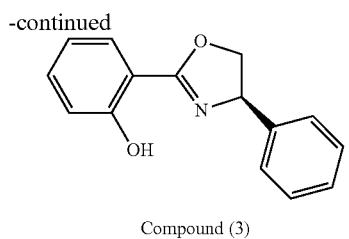

Compound (3)

Next, the measurement results of nuclear magnetic resonance spectrometry of Compound (3) are shown below: $^1$H NMR (400 MHz, CDCl$_3$) 12.11 (s, 1H), 7.71 (d, 1H), 7.69-7.24 (m, 6H), 7.02 (d, 1H), 6.87 (t, 1H), 5.46 (t, 1H), 4.78 (t, 1H), 4.23 (t, 1H).

Next, Compound (3) (1.54 g) were added into a reaction bottle, and then heptane (70 mL) was added into the reaction bottle to dissolve Compound (3). Next, titanium tetrachloride (TiCl$_4$) (1.19 g) was added into the reaction bottle. After stirring at room temperature for 24 hours, a formation of tangerine solid was observed. After filtration, the solid was collected. Next, the solid was added into a reaction bottle. Next, tetrahydrofuran (THF) (60 mL) was added into the reaction bottle to dissolve the solid. Next, benzyl magnesium chloride solution (7.64 mL, with a concentration of 1M (dissolved in ethyl ether)) was added into the reaction bottle. After stirring at room temperature for 12 hours, a formation of purple solid was observed. The solvent was removed under vacuum, obtaining a catalyst composite of Organometallic complex (IV) and MgCl$_2$, with a yield of 99%. The synthesis pathway of the above reaction was as follows:

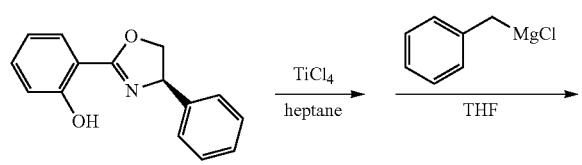

Compound (3)

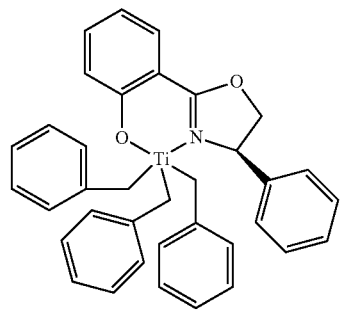

Organometallic complex (IV)

Next, the measurement results of nuclear magnetic resonance spectrometry of Organometallic complex (IV) are shown below: $^1$H NMR (400 MHz, C$_6$D$_6$) 7.84 (d, 1H), 7.50-7.10 (m, 21H), 6.91 (t, 1H), 6.85 (d, 1H), 3.57-3.64 (m, 3H).

Example 5

2-hydroxybenzonitrile (2 g), S-2-phenylglycinol (2.76 g), zinc chloride (ZnCl$_2$) (0.114 g) were added into a reaction bottle, and then toluene (17 mL) (serving as solvent) was added into the reaction bottle. After stirring at 110° C. for 12 hours, the solvent was removed and the crude product was purified by column chromatography (with hexane and ethyl acetate (EA) as the eluent, wherein hexane:EA=98:2), obtaining Compound (4). The synthesis pathway of the above reaction was as follows:

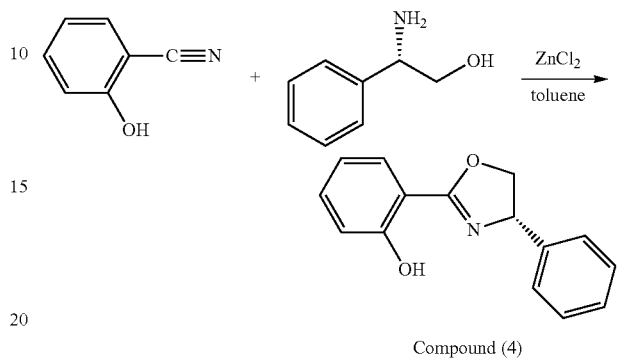

Compound (4)

Next, the measurement results of nuclear magnetic resonance spectrometry of Compound (4) are shown below: $^1$H NMR (400 MHz, CDCl$_3$): 12.11 (s, 1H), 7.71 (d, 1H), 7.69-7.24 (m, 6H), 7.02 (d, 1H), 6.87 (t, 1H), 5.46 (t, 1H), 4.78 (t, 1H), 4.23 (t, 1H).

Next, Compound (4) (1.5 g) was added into a reaction bottle, and then heptane (60 mL) was added into the reaction bottle to dissolve Compound (4). Next, titanium tetrachloride (TiCl$_4$) (0.7 g) was added into the reaction bottle. After stirring at room temperature for 24 hours, a formation of tangerine solid was observed. After filtration, the solid was collected. Next, the solid was added into a reaction bottle. Next, tetrahydrofuran (THF) (90 mL) was added into the reaction bottle to dissolve the solid. Next, benzyl magnesium chloride solution (8.3 mL, with a concentration of 1M (dissolved in ethyl ether)) was added into the reaction bottle. After stirring at room temperature for 12 hours, a formation of purple solid was observed. The solvent was removed under vacuum, obtaining a catalyst composite of Organometallic complex (V) and MgCl$_2$, with a yield of 99%. The synthesis pathway of the above reaction was as follows:

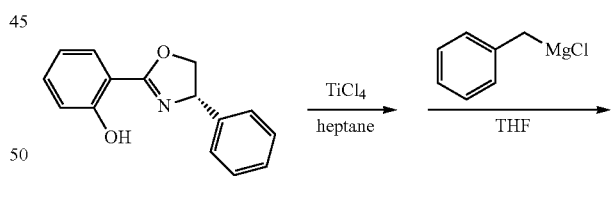

Compound (4)

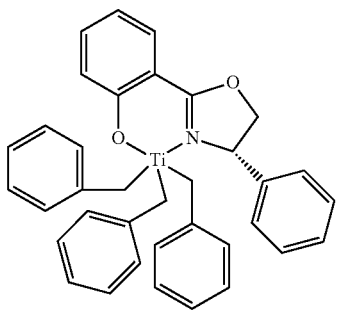

Organometallic complex (V)

Next, the measurement results of nuclear magnetic resonance spectrometry of Organometallic complex (V) are shown below: $^1$H NMR (400 MHz, $C_6D_6$) 7.84 (d, 1H), 7.50-7.10 (m, 21H), 6.91 (t, 1H), 6.85 (d, 1H), 3.57-3.64 (m, 3H).

Example 6

1-hydroxy-2-(benzo-2-oxazoline)benzene (1.5 g) was added into a reaction bottle, and then heptane (70 mL) was added into the reaction bottle to dissolve 1-hydroxy-2-(benzo-2-oxazoline)benzene. Next, titanium tetrachloride ($TiCl_4$) (0.8 g) was added into the reaction bottle. After stirring at room temperature for 24 hours, a formation of tangerine solid was observed. After filtration, the solid was collected. Next, the solid was added into a reaction bottle. Next, tetrahydrofuran (THF) (70 mL) was added into the reaction bottle to dissolve the solid. Next, benzyl magnesium chloride solution (4.6 mL, with a concentration of 1M (dissolved in ethyl ether)) was added into the reaction bottle. After stirring at room temperature for 12 hours, a formation of purple solid was observed. The solvent was removed under vacuum, obtaining a catalyst composite of Organometallic complex (VI) and $MgCl_2$, with a yield of 99%. The synthesis pathway of the above reaction was as follows:

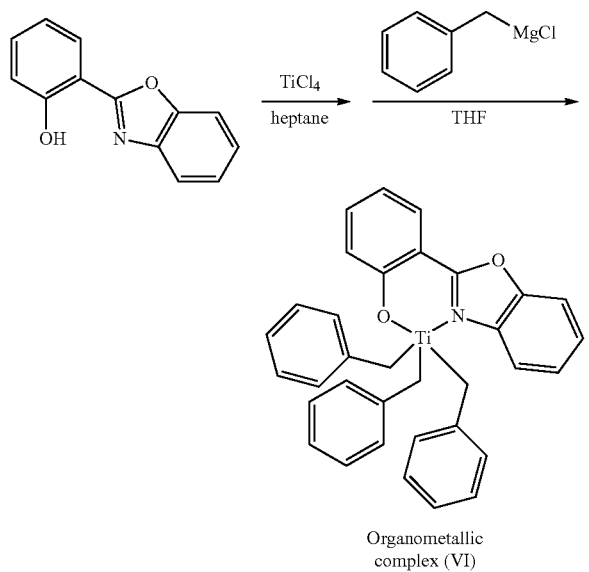

Organometallic complex (VI)

Next, the measurement results of nuclear magnetic resonance spectrometry of Organometallic complex (VI) are shown below: $^1$H NMR (400 MHz, $C_6D_6$) 8.12 (d, 1H), 7.35-7.05 (m, 20H), 6.85 (t, 1H), 6.74 (d, 1H).

Example 7

1-bromo-2-(3-isopropyl-2-oxazolin)benzene (2 g), aniline (0.369 g), palladium acetate ($Pd(OAc)_2$) (0.114 g), 1,1'-binaphthyl-2,2'-diphenyl phosphine (rac-BINAP) (0.079 g), and sodium tert-butoxide (NaOtBu) (0.341 g) were added into a reaction bottle, and then toluene (32 mL) (serving as solvent) was added into the reaction bottle. After stirring at 110° C. for 48 hours, the solvent was removed and the crude product was purified by column chromatography (with hexane and ethyl acetate (EA) as the eluent, wherein hexane:EA=95:5), obtaining Compound (5). The synthesis pathway of the above reaction was as follows:

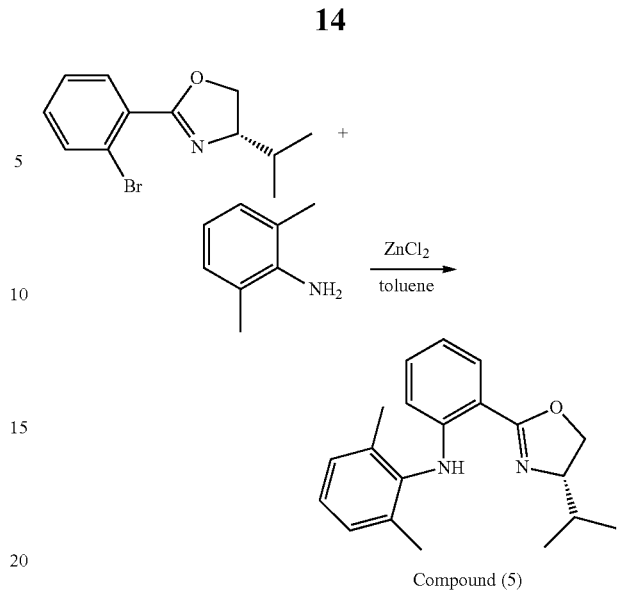

Compound (5)

Next, the measurement results of nuclear magnetic resonance spectrometry of Compound (5) are shown below: $^1$H NMR (400 MHz, $CDCl_3$): 9.95 (s, 1H), 7.74 (d, 1H), 7.13-7.07 (m, 4H), 6.61 (t, 1H), 6.19 (d, 1H), 4.33 (t, 1H), 4.18-4.02 (m, 2H), 2.19 (s, 6H), 0.97 (d, 3H), 0.92 (d, 3H).

Next, Compound (5) (1.0 g) were added into a reaction bottle, and then heptane (90 mL) was added into the reaction bottle to dissolve Compound (5). Next, titanium tetrachloride ($TiCl_4$) (0.7 g) was added into the reaction bottle. After stirring at room temperature for 24 hours, a formation of tangerine solid was observed. After filtration, the solid was collected. Next, the solid was added into a reaction bottle. Next, tetrahydrofuran (THF) (60 mL) was added into the reaction bottle to dissolve the solid. Next, benzyl magnesium chloride solution (4.6 mL, with a concentration of 1M (dissolved in ethyl ether)) was added into the reaction bottle. After stirring at room temperature for 12 hours, a formation of purple solid was observed. The solvent was removed under vacuum, obtaining a catalyst composite of Organometallic complex (VII) and $MgCl_2$, with a yield of 99%. The synthesis pathway of the above reaction was as follows:

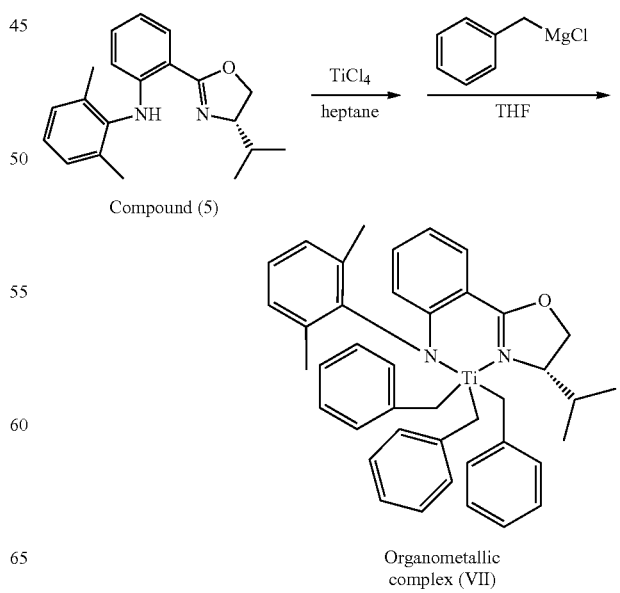

Organometallic complex (VII)

Next, the measurement results of nuclear magnetic resonance spectrometry of Organometallic complex (VII) are shown below: $^1$H NMR (400 MHz, $C_6D_6$) 8.12 (d, 1H), 7.30-6.90 (m, 19H), 6.63 (t, 1H), 6.38 (d, 1H), 4.00-3.73 (m, 3H), 2.74 (s, 6H), 2.23 (d, 6H), 0.84 (s, 3H), 0.74 (s, 3H).

Preparation of Polyethylene (PE) Polymer

Example 8

Heptane (200 mL) was added into an autocalve, and then triisobutylalumium (0.33 mmol), triethylaluminum (TEAl) (1 mmol) (serving as co-catalyst) and the catalyst composite of Example 2 (including Organometallic complex (II) and carrier (magnesium chloride, $MgCl_2$)) (5 μmol) were added into the high-pressure reactor in sequence, wherein the molar ratio of the co-catalyst to Organometallic complex (II) was 200:1. Next, the autoclave was heated to 60° C., and ethylene (with an input pressure of 500 psi) was added into the autovalve. After reacting for 60 minutes, the result was filtrated and then the filter cake was dried, obtaining a white polyethylene (PE) polymer. Herein, it is observed that the obtained polyethylene (PE) polymer was in powder shape, and there was no fouling problem in the reactor.

Next, the weight and viscosity-average molecular weight (viscosity-average molecular weight, Mv) of the obtained polyethylene (PE) polymer were measured. Herein, the viscosity-average molecular weight (Mv) of the polyethylene (PE) polymer was measured by a method according to ASTM-D 4020. Next, the catalytic activity and productivity were measured, and the results are shown in Table 1. The catalytic activity is determined by the following equation: catalytic activity=(kgPE/$mol_{cat}$)/T, wherein kgPE refers to the weight of polyethylene (PE) polymer (kg), $mol_{cat}$ refers to the number of moles of organometallic complex, and T refers to process time (hour). The productivity is determined by the following equation: gPE/g-cat, wherein gPE refers to the weight of polyethylene (PE) polymer (g) and g-cat refers to the weight of organometallic complex (g).

Example 9

Example 9 was performed in the same manner as in Example 8, except that Organometallic complex (I) was replaced with Organometallic complex (II), obtaining the polyethylene (PE) polymer. Next, the weight and viscosity-average molecular weight (viscosity-average molecular weight, Mv) of the obtained polyethylene (PE) polymer, the catalytic activity and the productivity were measured, and the results are shown in Table 1.

Example 10

Example 10 was performed in the same manner as in Example 8, except that Organometallic complex (I) was replaced with organometallic complex (III), obtaining the polyethylene (PE) polymer. Next, the weight and viscosity-average molecular weight (viscosity-average molecular weight, Mv) of the obtained polyethylene (PE) polymer, the catalytic activity and the productivity were measured, and the results are shown in Table 1.

Example 11

Example 11 was performed in the same manner as in Example 8, except that Organometallic complex (I) was replaced with organometallic complex (IV), obtaining the polyethylene (PE) polymer. Next, the weight and viscosity-average molecular weight (viscosity-average molecular weight, Mv) of the obtained polyethylene (PE) polymer, the catalytic activity and the productivity were measured, and the results are shown in Table 1.

Example 12

Example 12 was performed in the same manner as in Example 8, except that Organometallic complex (I) was replaced with organometallic complex (V), obtaining the polyethylene (PE) polymer. Next, the weight and viscosity-average molecular weight (viscosity-average molecular weight, Mv) of the obtained polyethylene (PE) polymer, the catalytic activity and the productivity were measured, and the results are shown in Table 1.

Example 13

Example 13 was performed in the same manner as in Example 8, except that Organometallic complex (I) was replaced with organometallic complex (VI), obtaining the polyethylene (PE) polymer. Next, the weight and viscosity-average molecular weight (viscosity-average molecular weight, Mv) of the obtained polyethylene (PE) polymer, the catalytic activity and the productivity were measured, and the results are shown in Table 1.

Example 14

Example 14 was performed in the same manner as in Example 8, except that Organometallic complex (I) was replaced with organometallic complex (VII), obtaining the polyethylene (PE) polymer. Next, the weight and viscosity-average molecular weight (viscosity-average molecular weight, Mv) of the obtained polyethylene (PE) polymer, the catalytic activity and the productivity were measured, and the results are shown in Table 1.

TABLE 1

| | catalyst | catalytic activity (kgPE/$mol_{cat}$-hours) | Productivity (gPE/g-cat) | viscosity-average molecular weight (g/mol) |
|---|---|---|---|---|
| Example 8 | Organometallic complex (I) | 147 | 137 | ~4.1 × 10$^6$ |
| Example 9 | Organometallic complex (II) | 16502 | 20344 | ~4.3 × 10$^6$ |
| Example 10 | Organometallic complex (III) | 4515 | 5871 | ~5.5 × 10$^6$ |
| Example 11 | Organometallic complex (IV) | 5874 | 6950 | ~4.7 × 10$^6$ |
| Example 12 | Organometallic complex (V) | 748 | 915 | ~4.0 × 10$^6$ |
| Example 13 | Organometallic complex (VI) | 5568 | 6588 | ~3.8 × 10$^6$ |
| Example 14 | Organometallic complex (VII) | 88 | 96 | ~5.4 × 10$^6$ |

As shown in Table 1, the organometallic complex of the disclosure can be used in concert with a non-methylaluminoxane co-catalyst and a carrier to form a catalyst composition, which can be used for preparing ultra-high-molecular-weight polyethylene (PE) without the fouling problem of reactor.

Example 15

Heptane (200 mL) was added into the autoclave, and then triisobutylalumium (0.33 mmol), triethyl aluminum (TEAl)

(1 mmol) (serving as co-catalyst) and Organometallic complex (HI) (5 μmol) (without magnesium chloride carrier) were added into the autoclave in sequence, wherein the molar ratio of the co-catalyst to Organometallic complex (II) was 200:1.

Next, the autoclave was heated to 60° C., and ethylene (with an input pressure of 500 psi) was added into the autoclave. After reacting for 20 minutes, the result was filtrated and then the filter cake was dried, obtaining a white polyethylene (PE) polymer. Next, the weight and viscosity-average molecular weight (viscosity-average molecular weight, Mv) of the obtained polyethylene (PE) polymer, the catalytic activity and the productivity were measured. Herein, the viscosity-average molecular weight of the polyethylene (PE) polymer was about $3.5 \times 10^6$ g/mol, the catalytic activity was 3485 kgPE/mol$_{cat}$-hours and the productivity was 1432 gPE/g-cat.

As shown in Example 15, the organometallic complex of the disclosure can be used merely in concert with co-catalyst to form a catalyst composition which can be used for preparing ultra-high-molecular-weight polyethylene (PE). Namely, polyethylene (PE) can be prepared by the catalyst composition, which includes the organometallic complex of the disclosure and a co-catalyst and is free of a carrier.

Example 16

Organometallic complex (II) (5 μmol) was dissolved in toluene (5 mL) to obtain a solvent, and then silicon oxide carrier (125 mg) modified by methylaluminoxane (MAO) was added into the solvent to obtain a mixture. The mixture was stirred at room temperature for 1 hour, obtaining a mixture. Heptane (200 mL) was added into an autoclave, and then triisobutylalumium (0.33 mmol) and the aforementioned mixture were added into the autoclave, wherein the molar ratio of the co-catalyst to Organometallic complex was 300:1.

Next, the autoclave was heated to 60° C., and ethylene (with an input pressure of 500 psi) was added into the autoclave. After reacting for 20 minutes, the result was filtrated and then the filter cake was dried, obtaining a white polyethylene (PE) polymer. Next, the weight and viscosity-average molecular weight (viscosity-average molecular weight, Mv) of the obtained polyethylene (PE) polymer, the catalytic activity and the productivity were measured. Herein, the viscosity-average molecular weight of the polyethylene (PE) polymer was about $1.4 \times 10^6$ g/mol, the catalytic activity was 1130 kgPE/mol$_{cat}$-hours and the productivity was 15 gPE/g-cat.

As shown in Example 16, the organometallic complex of the disclosure can be used in concert with methylaluminoxane (MAO) (serving as co-catalyst) to form a catalyst composition which can be used for preparing ultra-high-molecular-weight polyethylene (PE).

Example 17

Example 17 was performed in the same manner as in Example 9, except that the input pressure of ethylene was reduced from 500 psi to 250 psi, obtaining polyethylene (PE) polymer. Next, the weight and viscosity-average molecular weight (viscosity-average molecular weight, Mv) of the obtained polyethylene (PE) polymer, the catalytic activity and the productivity were measured, and the results are shown in Table 2.

Example 18

Example 18 was performed in the same manner as in Example 9, except that the input pressure of ethylene was reduced from 500 psi to 150 psi, obtaining polyethylene (PE) polymer. Next, the weight and viscosity-average molecular weight (viscosity-average molecular weight, Mv) of the obtained polyethylene (PE) polymer, the catalytic activity and the productivity were measured, and the results are shown in Table 2.

Example 19

Example 19 was performed in the same manner as in Example 9, except that the input pressure of ethylene was reduced from 500 psi to 150 psi and the process temperature was increased from 60° C. to 70° C., obtaining polyethylene (PE) polymer. Next, the weight and viscosity-average molecular weight (viscosity-average molecular weight, Mv) of the obtained polyethylene (PE) polymer, the catalytic activity and the productivity were measured, and the results are shown in Table 2.

Example 20

Example 20 was performed in the same manner as in Example 9, except that the input pressure of ethylene was reduced from 500 psi to 150 psi and the process temperature was increased from 60° C. to 80° C., obtaining polyethylene (PE) polymer. Next, the weight and viscosity-average molecular weight (viscosity-average molecular weight, Mv) of the obtained polyethylene (PE) polymer, the catalytic activity and the productivity were measured, and the results are shown in Table 2.

Example 21

Example 21 was performed in the same manner as in Example 9, except that the input pressure of ethylene was reduced from 500 psi to 150 psi and the process time was increased from 60 minutes to 120 minutes, obtaining polyethylene (PE) polymer. Next, the weight and viscosity-average molecular weight (viscosity-average molecular weight, Mv) of the obtained polyethylene (PE) polymer, the catalytic activity and the productivity were measured, and the results are shown in Table 2.

Example 22

Example 22 was performed in the same manner as in Example 9, except that the input pressure of ethylene was reduced from 500 psi to 150 psi and the process time was increased from 60 minutes to 180 minutes, obtaining polyethylene (PE) polymer. Next, the weight and viscosity-average molecular weight (viscosity-average molecular weight, Mv) of the obtained polyethylene (PE) polymer, the catalytic activity and the productivity were measured, and the results are shown in Table 2.

Example 23

Example 23 was performed in the same manner as in Example 9, except that the input pressure of ethylene was reduced from 500 psi to 150 psi, hydrogen gas (50 mL) was introduced into the autoclave and the process temperature was increased from 60° C. to 80° C., obtaining polyethylene (PE) polymer. Next, the weight and viscosity-average molecular weight (viscosity-average molecular weight, Mv) of the obtained polyethylene (PE) polymer, the catalytic activity and the productivity were measured, and the results are shown in Table 2.

Example 24

Example 24 was performed in the same manner as in Example 9, except that the input pressure of ethylene was reduced from 500 psi to 150 psi, hydrogen gas (100 mL) was introduced into the autoclave and the process temperature was increased from 60° C. to 80° C., obtaining polyethylene (PE) polymer. Next, the weight and viscosity-average molecular weight (viscosity-average molecular weight, Mv) of the obtained polyethylene (PE) polymer, the catalytic activity and the productivity were measured, and the results are shown in Table 2.

Example 25

Example 25 was performed in the same manner as in Example 9, except that the input pressure of ethylene was reduced from 500 psi to 150 psi, hydrogen gas (200 mL) was introduced into the autoclave and the process temperature was increased from 60° C. to 80° C., obtaining polyethylene (PE) polymer. Next, the weight and viscosity-average molecular weight (viscosity-average molecular weight, Mv) of the obtained polyethylene (PE) polymer, the catalytic activity and the productivity were measured, and the results are shown in Table 2.

Example 26

Example 26 was performed in the same manner as in Example 9, except that the input pressure of ethylene was reduced from 500 psi to 75 psi and the process temperature was increased from 60° C. to 80° C., obtaining polyethylene (PE) polymer. Next, the weight and viscosity-average molecular weight (viscosity-average molecular weight, Mv) of the obtained polyethylene (PE) polymer, the catalytic activity and the productivity were measured, and the results are shown in Table 2.

Example 27

Example 27 was performed in the same manner as in Example 9, except that the input pressure of ethylene was reduced from 500 psi to 150 psi and the process temperature was reduced from 60° C. to 50° C., obtaining polyethylene (PE) polymer. Next, the weight and viscosity-average molecular weight (viscosity-average molecular weight, Mv) of the obtained polyethylene (PE) polymer, the catalytic activity and the productivity were measured, and the results are shown in Table 2.

Example 28

Example 28 was performed in the same manner as in Example 9, except that the input pressure of ethylene was reduced from 500 psi to 150 psi and the process temperature was reduced from 60° C. to 100° C., obtaining polyethylene (PE) polymer. Next, the weight and viscosity-average molecular weight (viscosity-average molecular weight, Mv) of the obtained polyethylene (PE) polymer, the catalytic activity and the productivity were measured, and the results are shown in Table 2.

TABLE 2

|  | ethylene (psi) | temperature (° C.) | process time (hours) | catalytic activity (kgPE/mol$_{cat}$·hours) | productivity (gPE/g-cat) | viscosity-average molecular weight (g/mol) |
|---|---|---|---|---|---|---|
| Example 9 | 500 | 60 | 60 | 16502 | 20344 | $4.3 \times 10^6$ |
| Example 17 | 250 | 60 | 60 | 8481 | 10456 | $3.7 \times 10^6$ |
| Example 18 | 150 | 60 | 60 | 4557 | 5619 | $3.4 \times 10^6$ |
| Example 19 | 150 | 70 | 60 | 8250 | 10171 | $2.5 \times 10^6$ |
| Example 20 | 150 | 80 | 60 | 10561 | 13020 | $1.5 \times 10^6$ |
| Example 21 | 150 | 60 | 120 | 5523 | 13617 | $4.2 \times 10^6$ |
| Example 22 | 150 | 60 | 180 | 4842 | 17910 | $4.7 \times 10^6$ |
| Example 23 | 150/ H$_2$(50 ml) | 80 | 60 | 4971 | 6129 | $1.4 \times 10^6$ |
| Example 24 | 150/ H$_2$(100 ml) | 80 | 60 | 4413 | 5441 | $1.1 \times 10^6$ |
| Example 25 | 150/ H$_2$(200 ml) | 80 | 60 | 4077 | 5026 | $0.74 \times 10^6$ |
| Example 26 | 75 | 80 | 60 | 1343 | 1655 | $1.9 \times 10^6$ |
| Example 27 | 150 | 50 | 60 | 267 | 330 | Not measured |
| Example 28 | 150 | 100 | 60 | 757 | 933 | Not measured |

As shown in Table 2, when preparing the polyethylene (PE) polymer with the catalyst composition of the disclosure, the polymerization can be performed at various input pressure of ethylene, process temperature and process time. In addition, as shown in Example 27 and Example 28, when the process temperature is relative low (such as 50° C.) or relative high (such as 100° C.), the catalytic activity is relatively low.

Example 29

Example 29 was performed in the same manner as in Example 9, except that the molar ratio of the co-catalyst to the organometallic complex (i.e. (Al/Ti)) was reduced from 200 to 100 by adjusting the amount of triethyl aluminum (TEAl), obtaining polyethylene (PE) polymer. Next, the weight and viscosity-average molecular weight (viscosity-average molecular weight, Mv) of the obtained polyethylene (PE) polymer, the catalytic activity and the productivity were measured, and the results are shown in Table 3.

Example 30

Example 30 was performed in the same manner as in Example 9, except that the molar ratio of the catalytic promoter to the organometallic complex (i.e. (Al/Ti)) was reduced from 200 to 40 by adjusting the amount of triethyl aluminum (TEAl). Next, the weight and viscosity-average molecular weight (viscosity-average molecular weight, Mv) of the obtained polyethylene (PE) polymer, the catalytic activity and the productivity were measured, and the results are shown in Table 3.

TABLE 3

| | ethylene (psi) | temperature (° C.) | time (hours) | Al/Ti | catalytic activity (kgPE/mol$_{cat}$-hours) | productivity (gPE/g-cat) | viscosity-average molecular weight (g/mol) |
|---|---|---|---|---|---|---|---|
| Example 9 | 500 | 60 | 60 | 200 | 16502 | 20344 | ~4.3 × 10$^6$ |
| Example 29 | 500 | 60 | 60 | 100 | 8819 | 10872 | ~4.1 × 10$^6$ |
| Example 30 | 500 | 60 | 60 | 40 | 616 | 760 | Not measured |

As shown in Table 3, when preparing the polyethylene (PE) polymer with the catalyst composition of the disclosure, the amount of co-catalyst can be reduced (i.e. the molar ratio of the co-catalyst to the catalyst can be reduced to less than 200:1, such as 100:1, or 40:1).

Example 31

Zirconium tetrachloride (ZrCl$_4$) (1.75 g) was dissolved in tetrahydrofuran (THF) (70 mL), obtaining a zirconium tetrachloride solution. Next, Compound (1) (1.54 g) was dissolved in tetrahydrofuran (THF), and then the result was added dropwise into the zirconium tetrachloride solution. Next, After stirring at room temperature for 24 hours, the solvent was removed, obtaining Organometallic complex (VIII) (yellow solid) with a yield of 99%. The synthesis pathway of the above reaction was as follows:

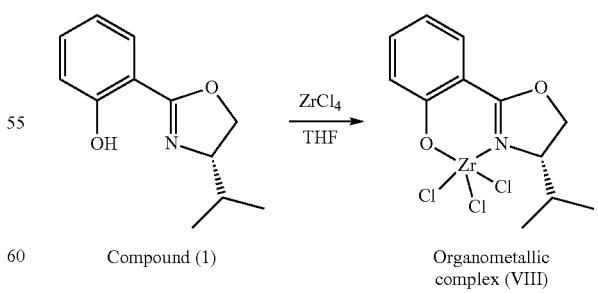

Compound (1)　　　Organometallic complex (VIII)

Next, the measurement results of nuclear magnetic resonance spectrometry of Organometallic complex (VIII) are shown below: $^1$H NMR (400 MHz, d8-THF) 8.25 (d, 1H), 7.65 (t, 1H), 6.94 (t, 1H), 6.43 (t, 1H), 4.70 (d, 2H), 3.31 (t, 1H), 0.84 (s, 3H), 0.54 (s, 3H).

It will be clear that various modifications and variations can be made to the disclosed methods and materials. It is intended that the specification and examples be considered as exemplary only, with the true scope of the disclosure being indicated by the following claims and their equivalents.

What is claimed is:

1. An organometallic complex, represented by Formula (I)

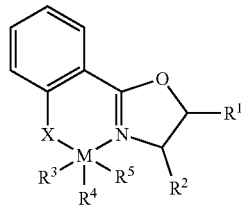

Formula (I)

wherein M is Ti, Zr, or Hf; X is —O—, or —$NR_6$—; $R^1$ and $R^2$ are independently hydrogen, $C_{1-6}$ alkyl group, $C_{6-12}$ aryl group, or $R^1$ and $R^2$ are joined together to form a fused $C_{6-12}$ aryl moiety; $R^3$, $R^4$ and $R^5$ are independently fluoride, chloride, bromide, $C_{1-6}$ alkyl group, $C_{6-12}$ aryl group, $C_{3-6}$ heteroaryl, $C_{7-3}$ arylalkyl group, or $C_{7-12}$ alkylaryl group; and $R^6$ is hydrogen, $C_{6-12}$ aryl group, or $C_{7-12}$ alkylaryl group.

2. The organometallic complex as claimed in claim 1, wherein $R^1$ and $R^2$ are independently hydrogen, methyl group, ethyl group, propyl group, butyl group, pentyl group, hexyl group, phenyl group, biphenyl group, or naphthyl group.

3. The organometallic complex as claimed in claim 1, wherein $R^1$ and $R^2$ are joined together to form a fused benzene or naphthalene ring.

4. The organometallic complex as claimed in claim 1, wherein $R^3$, $R^4$ and $R^5$ are independently fluoride, chloride, bromide, methyl group, ethyl group, propyl group, butyl group, pentyl group, hexyl group, phenyl group, biphenyl group, naphthyl group, furyl group, imidazolyl group, pyridyl group, thiazolyl group, thienyl group, triazolyl group, benzyl group, methylbenzyl group, phenylethyl group, phenylpropyl group, phenylbutyl group, diphenyl methyl group, methylphenyl group, dimethylphenyl group, dimethylphenyl group, ethylphenyl group, propylphenyl group, or butylphenyl group.

5. The organometallic complex as claimed in claim 1, wherein $R^6$ is hydrogen, phenyl group, biphenyl group, naphthyl group, methylphenyl group, dimethylphenyl group, dimethylphenyl group, ethylphenyl group, propylphenyl group, or butylphenyl group.

6. The organometallic complex as claimed in claim 1, wherein the organometallic complex is

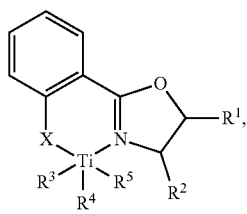

wherein X is —O—, or —$NR_6$—; $R^1$ and $R^2$ are independently hydrogen, $C_{1-6}$ alkyl group, $C_{6-12}$ aryl group, or $R^1$ and $R^2$ are joined together to form a fused $C_{6-12}$ aryl moiety; $R^3$, $R^4$ and $R^5$ are independently fluoride, chloride, bromide, $C_{1-6}$ alkyl group, $C_{6-12}$ aryl group, $C_{3-6}$ heteroaryl, $C_{7-13}$ arylalkyl group, or $C_{7-12}$ alkylaryl group; and $R^6$ is hydrogen, $C_{6-12}$ aryl group, or $C_{7-12}$ alkylaryl group.

7. The organometallic complex as claimed in claim 1, wherein the organometallic complex is

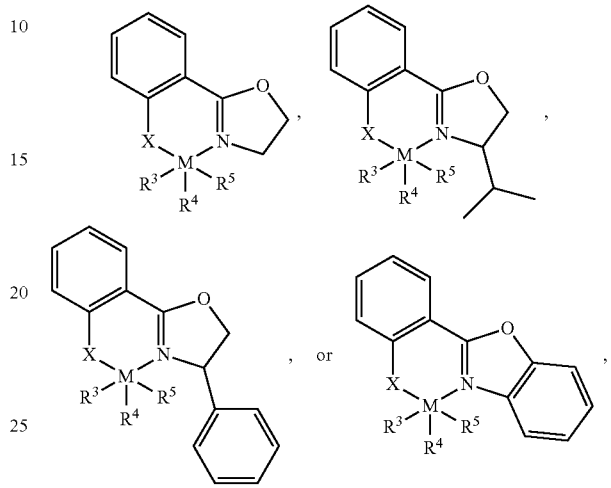

wherein M is Ti, Zr, or Hf; X is —O or —$NR^6$—; $R^3$, $R^4$ and $R^5$ are independently fluoride, chloride, bromide, $C_{1-6}$ alkyl group, $C_{6-12}$ aryl group, $C_{3-6}$ heteroaryl, $C_{7-13}$ arylalkyl group, or $C_{7-12}$ alkylaryl group; and $R^6$ is hydrogen, $C_{6-12}$ aryl group, or $C_{7-12}$ alkylaryl group.

8. The organometallic complex as claimed in claim 1, wherein the organometallic complex is

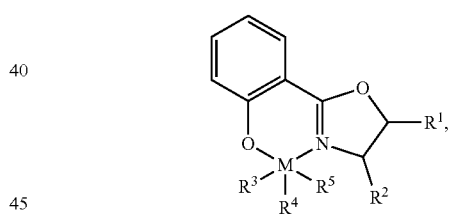

or

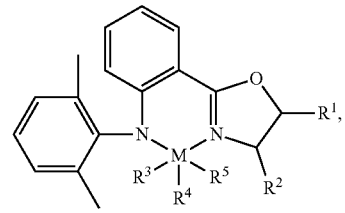

wherein M is Ti, Zr, or Hf; $R^1$ and $R^2$ are independently hydrogen, $C_{1-6}$ alkyl group, $C_{6-12}$ aryl group, or $R^1$ and $R^2$ are joined together to form a fused $C_{6-12}$ aryl moiety; and $R^3$, $R^4$ and $R^5$ are independently fluoride, chloride, bromide, $C_{1-6}$ alkyl group, $C_{6-12}$ aryl group, $C_{3-6}$ heteroaryl, $C_{7-13}$ arylalkyl group, or $C_{7-12}$ alkylaryl group.

9. The organometallic complex as claimed in claim 1, wherein the organometallic complex is

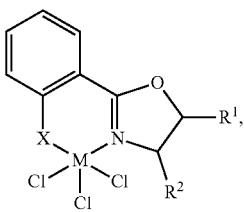

or

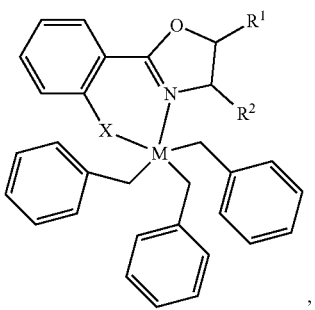

wherein M is Ti, Zr, or Hf; X is —O—, or —NR⁶—; $R^1$ and $R^2$ are independently hydrogen, $C_{1-6}$ alkyl group, $C_{6-12}$ aryl group, or $R^1$ and $R^2$ are joined together to form a fused $C_{6-12}$ aryl moiety; and $R^6$ is hydrogen, $C_{6-12}$ aryl group, or $C_{7-12}$ alkylaryl group.

10. A catalyst composition, comprising:
the organometallic complex as claimed in claim 1; and
a co-catalyst, wherein a molar ratio of the co-catalyst to the organometallic complex is 2000:1 to 10:1.

11. The catalyst composition as claimed in claim 10, wherein the co-catalyst is trimethylaluminum, triethylaluminum, triisopropylaluminum, triisobutylaluminum, methylaluminum dichloride, dimethylaluminum chloride, ethylaluminumsesquichloride, diethylaluminum chloride, ethylaluminumdichloride, methylaltuninoxane, or a combination thereof.

12. The catalyst composition as claimed in claim 10, further comprising a carrier, wherein the weight ratio of the carrier to the organometallic complex is 200:1 to 1:1.

13. The catalyst composition as claimed in claim 12, wherein the carrier is aluminum oxide, silicon oxide, clay, zeolite, titanium oxide, zirconium oxide, magnesium oxide, or magnesium chloride.

14. A method for preparing a polyolefin, comprising:
subjecting an olefin monomer in the presence of the catalyst composition as claimed in claim 10 to a polymerization, obtaining a polyolefin.

15. The method for preparing the polyolefin as claimed in claim 14, wherein the polymerization is performed in the presence of hydrogen gas.

16. The method for preparing the polyolefin as claimed in claim 14, wherein an input pressure of the olefin monomer is 50 psi to 1000 psi.

17. The method for preparing the polyolefin as claimed in claim 14, wherein a process time of the polymerization is 10 minutes to 300 minutes.

18. The method for preparing the polyolefin as claimed in claim 14, wherein a process temperature of the polymerization is 50° C. to 100° C.

19. The method for preparing the polyolefin as claimed in claim 15, wherein a volume ratio of the olefin monomer to the hydrogen gas is 100:1 to 10:1.

20. The method for preparing the polyolefin as claimed in claim 14, wherein the polyolefin has a viscosity-average molecular weight of 500,000 g/mol to 6,000,000 g/mol.

21. The method for preparing the polyolefin as claimed in claim 14, wherein the olefin monomer is ethylene, propylene, isobutylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, isoprene, or 1-decene.

* * * * *